United States Patent
Willhite et al.

(10) Patent No.: US 7,660,239 B2
(45) Date of Patent: Feb. 9, 2010

(54) NETWORK DATA RE-ROUTING

(75) Inventors: Nelson Willhite, Sunnyvale, CA (US); Mike Noll, San Jose, CA (US); Robert Steven Martin, Los Gatos, CA (US); Akhil Duggal, Los Altos, CA (US); Craig Lindberg, Nevada City, CA (US); Thomas Carleton Jones, San Jose, CA (US); Srinivas Komidi, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 585 days.

(21) Appl. No.: 10/831,629

(22) Filed: Apr. 23, 2004

(65) Prior Publication Data

US 2004/0213148 A1 Oct. 28, 2004

Related U.S. Application Data

(60) Provisional application No. 60/465,652, filed on Apr. 25, 2003.

(51) Int. Cl.
*H04L 12/26* (2006.01)

(52) U.S. Cl. ................ 370/225; 370/388; 370/229
(58) Field of Classification Search ........... 370/230, 370/225, 388, 229
See application file for complete search history.

(56) References Cited

U.S. PATENT DOCUMENTS 4,763,329 A * 8/1988 Green .................. 370/225

(Continued)

FOREIGN PATENT DOCUMENTS

EP 0 959 591 11/1999

(Continued)

*Primary Examiner*—Thong H Vu
(74) *Attorney, Agent, or Firm*—Van Pelt, Yi & James LLP

(57) ABSTRACT

Transferring data via a switch fabric comprises: for each unit of data to be transferred, selecting one of a plurality of links from a fabric access node to the switch fabric to transfer the unit of data, and in the event that one or more of the plurality of links become unavailable, such that one or more remaining links remain available for transferring data, transferring a subsequently received unit of data via one of the remaining links.

21 Claims, 13 Drawing Sheets

U.S. PATENT DOCUMENTS

| | | | |
|---|---|---|---|
| 4,929,939 A * | 5/1990 | Varma et al. | 340/2.24 |
| 5,084,816 A * | 1/1992 | Boese et al. | 714/4 |
| 5,862,338 A * | 1/1999 | Walker et al. | 709/224 |
| 6,055,234 A * | 4/2000 | Aramaki | 370/395.72 |
| 6,067,286 A | 5/2000 | Jones et al. | |
| 6,222,823 B1 * | 4/2001 | Smith et al. | 370/230 |
| 6,560,237 B1 * | 5/2003 | Hiscock et al. | 370/412 |
| 6,608,836 B2 * | 8/2003 | Mao et al. | 370/419 |
| 6,747,971 B1 * | 6/2004 | Hughes et al. | 370/387 |
| 6,952,401 B1 * | 10/2005 | Kadambi et al. | 370/232 |
| 6,959,002 B2 * | 10/2005 | Wynne et al. | 370/412 |
| 7,035,211 B1 * | 4/2006 | Smith et al. | 370/230 |
| 7,088,710 B1 * | 8/2006 | Johnson et al. | 370/357 |
| 7,151,744 B2 * | 12/2006 | Sarkinen et al. | 370/230 |
| 7,181,485 B1 * | 2/2007 | Lau et al. | 718/100 |
| 7,209,453 B1 * | 4/2007 | Yun et al. | 370/242 |
| 7,242,691 B2 * | 7/2007 | Mathews et al. | 370/413 |
| 7,251,219 B2 * | 7/2007 | Lakshmanamurthy et al. | 370/236 |
| 7,310,333 B1 * | 12/2007 | Conklin et al. | 370/388 |
| 2002/0031086 A1 * | 3/2002 | Welin | 370/229 |
| 2002/0057699 A1 * | 5/2002 | Roberts | 370/395.32 |
| 2002/0080723 A1 | 6/2002 | Hoch et al. | |
| 2002/0085551 A1 * | 7/2002 | Tzeng | 370/389 |
| 2002/0141344 A1 * | 10/2002 | Chidambaran et al. | 370/236 |
| 2004/0213151 A1 * | 10/2004 | Willhite et al. | 370/229 |
| 2005/0063701 A1 * | 3/2005 | Ovadia et al. | 398/45 |
| 2007/0130246 A1 * | 6/2007 | Lau et al. | 709/200 |

FOREIGN PATENT DOCUMENTS

WO    WO 02/13013    2/2002

* cited by examiner

US 7,660,239 B2

NETWORK DATA RE-ROUTING

CROSS REFERENCE TO RELATED APPLICATIONS

This application claims priority to U.S. Provisional Patent Application No. 60/465,652 entitled AN IMPROVED NETWORK SWITCH AND FABRIC ACCESS ARCHITECTURE filed Apr. 25, 2003, which is incorporated herein by reference for all purposes.

This application is related to co-pending U.S. patent application Ser. No. 10/740,720 entitled SWITCH FABRIC ACCESS SCHEDULER filed Dec. 18, 2003, which is incorporated herein by reference for all purposes, and co-pending U.S. patent application Ser. No. 10/831,628 entitled DATA SWITCHING USING SOFT CONFIGURATION, filed concurrently herewith, which is incorporated herein by reference for all purposes.

FIELD OF THE INVENTION

The present invention relates generally to data networks. More specifically, data switching is disclosed.

BACKGROUND OF THE INVENTION

In data communication networks, routers, switches, or other appropriate devices are often used to transfer data from a source to a destination. Many high-speed systems typically switch data using switch fabrics with multiple links each connecting a source address to a destination address. If any of the links fail, the data is typically rerouted based on software instructions. Rerouting data in software often slows down the system performance and therefore is undesirable. Furthermore, some of the existing systems use a striped architecture that divides data cells and transfers the cells across multiple links, thus failure in one link may result in exponential performance degradation of the system. It would be useful if data rerouting in the event of a link failure can be performed more efficiently, without further degrading the system's performance. It would also be desirable if the performance degradation of the fabric were more graceful in the event any of its links fail.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data switching is disclosed. In some embodiments, data is transferred from a source to a destination via multiple links to a switch fabric. If one of the links becomes unavailable, data can be continuously transferred from the source to the destination via the remaining links. Backpressure information indicating that a link is unavailable may be sent to the data source.

Figure 1A:
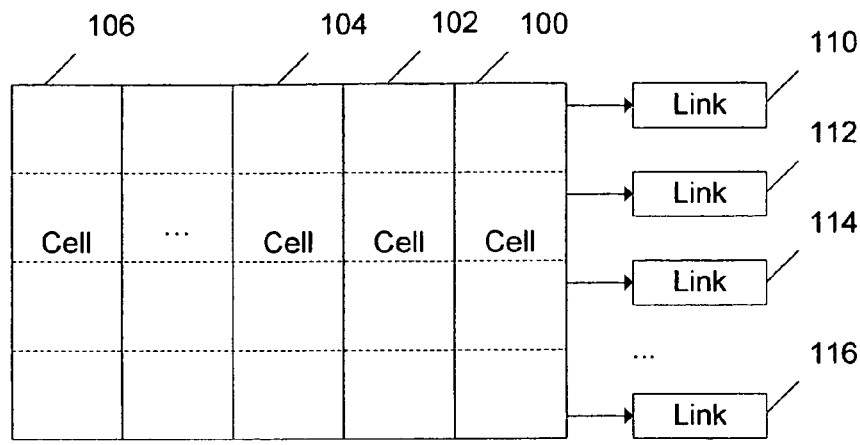
FIG. 1A is a diagram illustrating a switching system embodiment configured to switch striped cells.

In some switching systems, data packets are broken into cells and then sent across a switch fabric. As used herein, a cell refers to a unit of data that is transferred; other data units may also be used. In various embodiments, the length of the cells may be fixed or variable. The cells may be striped or non-striped. FIG. 1A is a diagram illustrating a switching system embodiment configured to switch striped cells. In this example, cells 100 through 106 are each divided into several sections that are sprayed across links 110 through 116. The number of links across which each cell is divided and, as a result, the number of cell sections may vary for different embodiments. The links are the physical connections configured to transfer the cells from their source to their destination. The collection of links and their interconnections is referred to as the switch fabric. In a striped fabric, such as the one illustrated in FIG. 1A, the data segments comprising each cell are transferred through the links in a synchronized fashion so that the segments can be assembled to reconstruct the original cell. In this example, the collection of links used to switch the cell behave as a single switch plane. One of the links is responsible for making the switching decisions, e.g., the one that happens to have the portion containing the control header and/or destination address data for the cell, and that link communicates the decisions to the other links across which the cells being switched are striped.

Figure 1B:
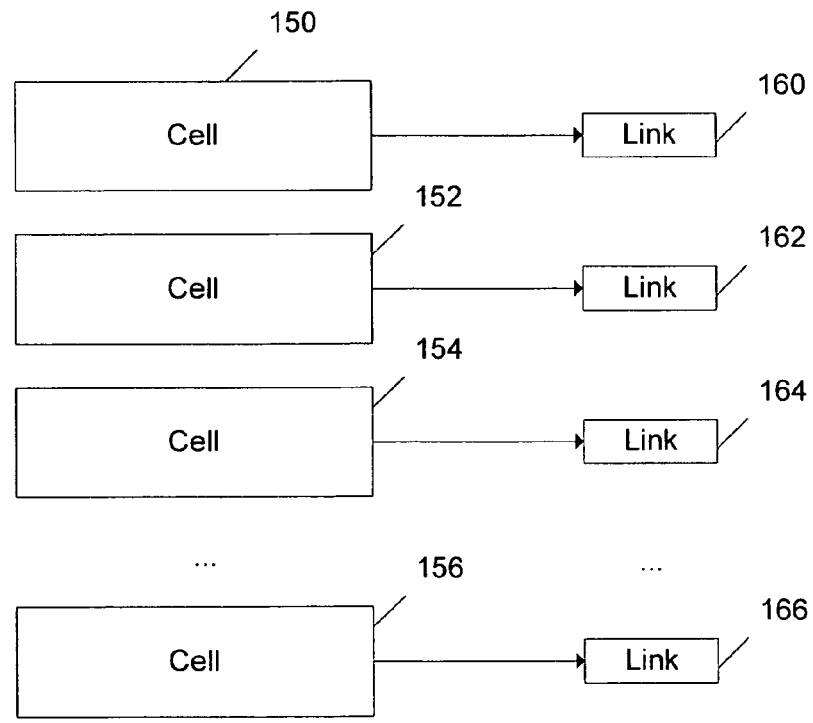
FIG. 1B illustrates a non-striping switch fabric embodiment. In this example, cells such as 150-156 are not subdivided.

FIG. 1B illustrates a non-striping switch fabric embodiment. In this example, cells such as 150-156 are not subdivided. Each of the cells is transferred as a whole through one of the links, such as links 160-166. The number of links may vary depending on the implementation. The links do not need to be synchronized and the cells can arrive out of order at the destination and then be re-sequenced. Synchronization or communication between the links is not required in this case. Thus, the switch fabric receiving the data from the links can behave as a collection of independent sub-fabrics.

Figure 2:
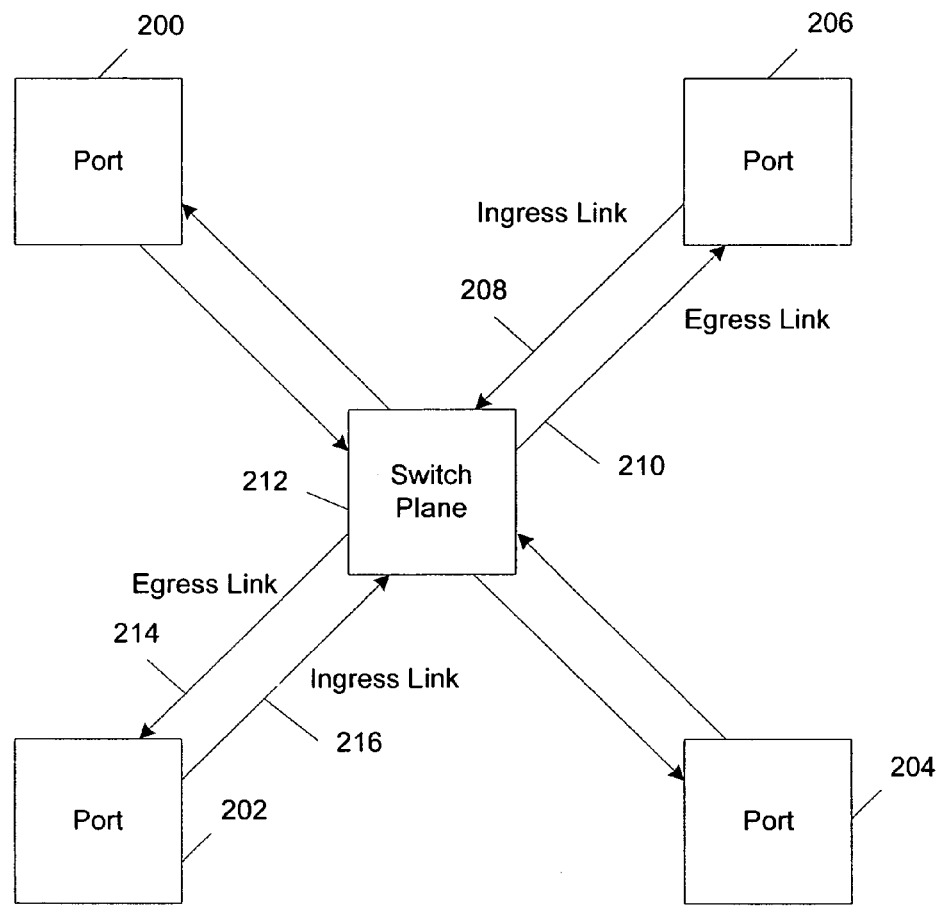
FIG. 2 is a block diagram illustrating a switch plane used in one embodiment.

FIG. 2 is a block diagram illustrating a switch plane used in one embodiment. In this example, ports 200-206 are logical sources or destinations that can be addressed for the purposes of transferring data. Each port may send data via the switch plane to one of the ports having a link to the switch plane or receive from the switch plane data sent into the switch plane from one of the ports having a link to the switch plane. The ports may be associated with one or more fabric access devices such as fabric access circuits or chips. A cell is transferred from its source port to its destination port via a switch plane 212. As used herein, a switch plane refers to a collection of switched paths by which data may be sent from any port having a link to the switch plane to any port having a link to the switch plane. A switch plane may be implemented as a circuit that includes multiple cross connection points wherein each of the cross connection points connects an input to an output and provides a switching path for the cells. A switch fabric may include one or more switch planes. A switch fabric may be implemented using one or more physical switch devices, such as one or more integrated circuits, and each such device may comprise one or more switch planes, depending on the configuration (e.g., the number of links each port has to the device).

In the example shown, there is a bi-directional connection between each port and the switch plane. Each bi-directional connection includes an ingress link used to transfer data from a port to the switch plane (e.g. ingress link 208, ingress link 216), and an egress link used to transfer data that has been switched by the switch plane to its destination (e.g. egress link 210 and egress link 214). For example, a data cell with a source port 206 and a destination port 202 is sent from port 206 to switch plane 212 via ingress link 208. The switch plane then switches the data cell and sends it on egress link 214. The data cell eventually reaches its destination port 202. In some embodiments, control information such as link availability, backpressure, etc. may be included in the header of a cell being sent to a port via an egress link. Details of the control information and its usage are discussed below.

Figure 3:
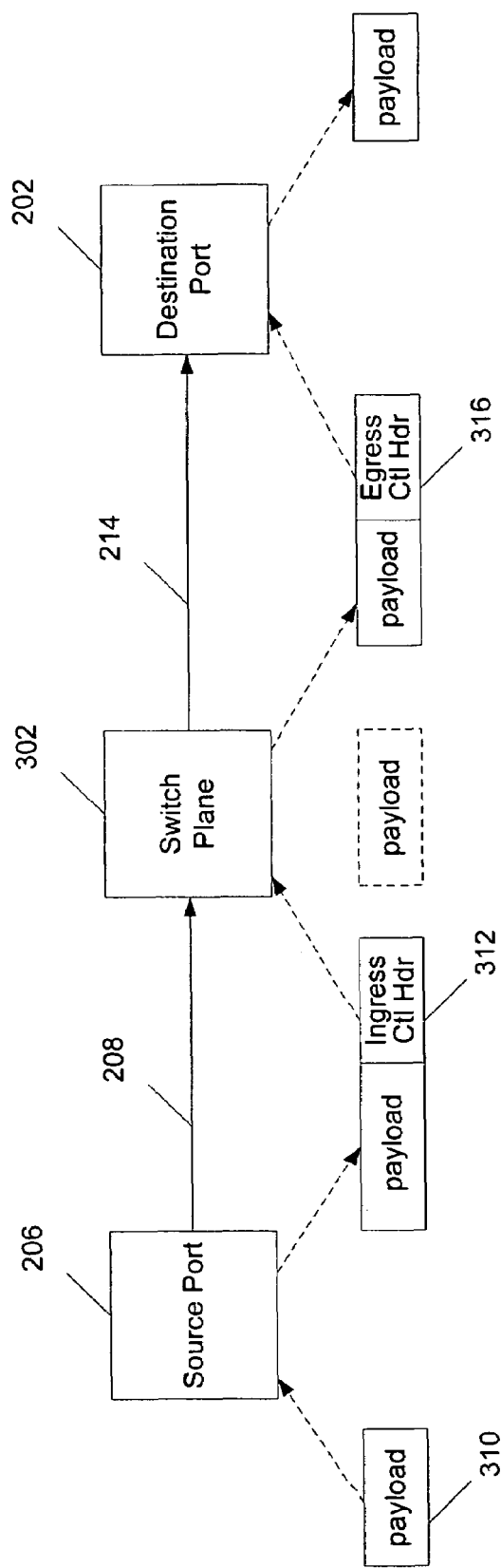
FIG. 3 is a diagram illustrating the data transfer between a source port and a destination port, according to some embodiments.

FIG. 3 is a diagram illustrating the data transfer between a source port and a destination port, according to some embodiments. In this example, a data cell is transferred from source port 206 to destination port 202 via switch 302. The corresponding ingress and egress links are 208 and 214, respectively. The data cell is manipulated to include appropriate headers at different times. In particular, the port prepends to the payload 310 an ingress control header 312, which is removed and processed by the switch 302. The switch 302 prepends an egress control header 316 to the payload 310 and sends the cell to the destination port 202, which removes and processes the egress control header 316 and delivers the payload 310 to its intended destination. Details of the process are discussed in FIGS. 4 through 6.

Figure 4:
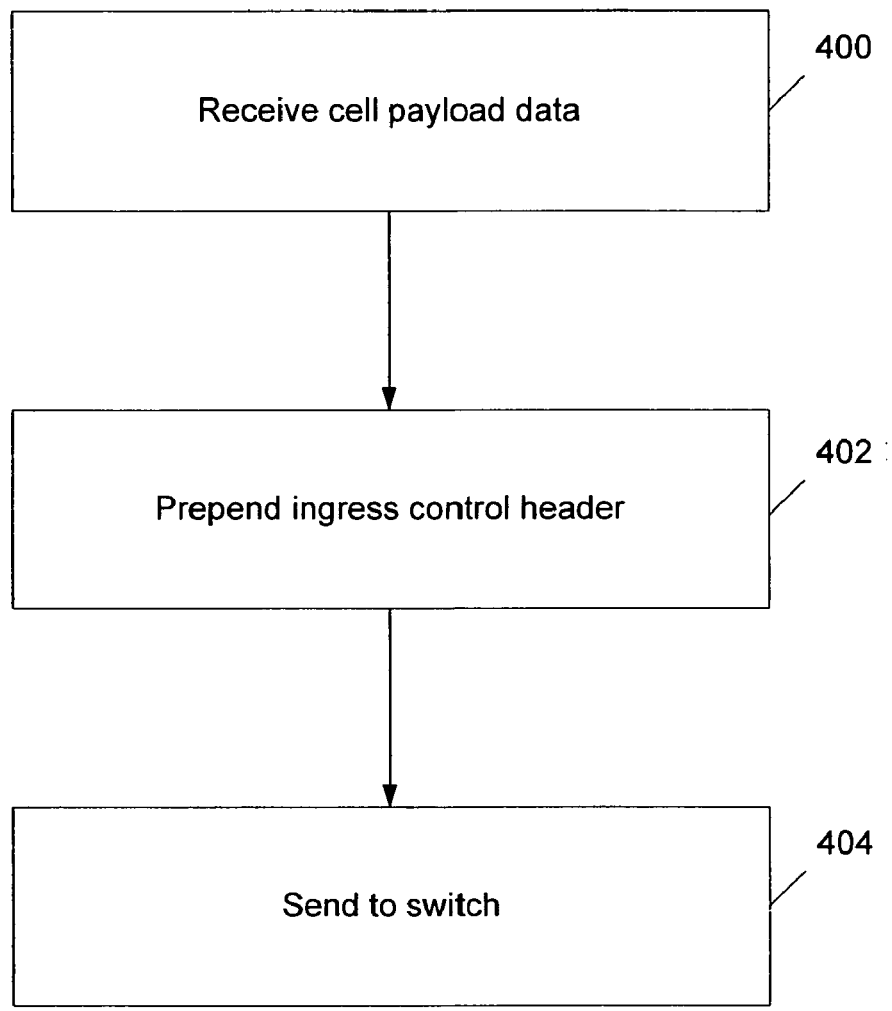
FIG. 4 is a flowchart illustrating the processing of a cell before it is switched, according to the example shown in FIG. 3.

FIG. 4 is a flowchart illustrating the processing of a cell before it is switched, according to the example shown in FIG. 3. In this example, once the payload data (310) of a cell is received (400), an ingress control header (312) is prepended to the payload data (402). The ingress control header (312) may include a synchronization flag used at the receiving end (i.e., the switch) to determine the availability of an egress link associated with the ingress link, as described more fully below, backpressure information relating to an egress link associated with the ingress link (e.g., informing the switch that the port cannot currently receive cells on the egress link), description of the payload, description of the destination, as well as other appropriate information or combinations thereof. The information may also be appended to the payload or arranged in some other appropriate format. The resulting cell is then sent to the switch (404).

Figure 5:
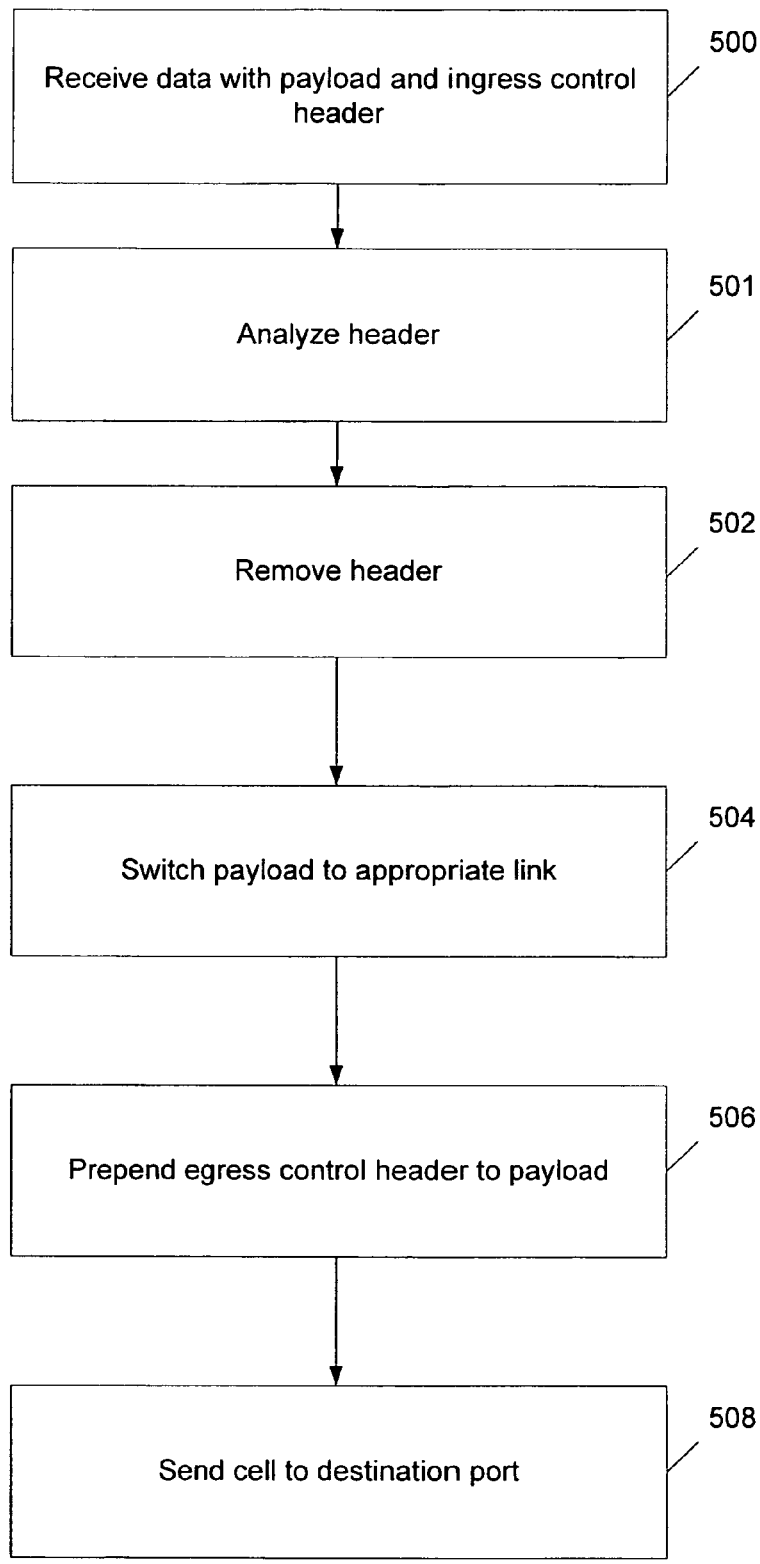
FIG. 5 is a flowchart illustrating the processing of a cell as it is being switched, according to some embodiments.

FIG. 5 is a flowchart illustrating the processing of a cell as it is being switched, according to some embodiments. In this example, a cell including a payload (e.g., 310) as well as an ingress control header (312) is received (500). The ingress control header is analyzed (501) and then removed (502). Based on the information included in the ingress control header, the appropriate egress link associated with the destination port is determined and the payload is switched to the link (504). An egress control header (316) is prepended to the payload (506), and the newly formed cell is sent to its destination port via the appropriate egress link (508). The egress header may include a synchronization flag indicating the synchronization state of an ingress link associated with the egress link, backpressure information associated with the ingress link associated with the egress link (e.g., telling the port not to send via the ingress link cells addressed to a particular destination with respect to which the switch is receiving backpressure), a description of the payload, a description of the source, as well as other appropriate information or combinations thereof. The information may also be appended to the payload or arranged in some other appropriate format.

Figure 6:
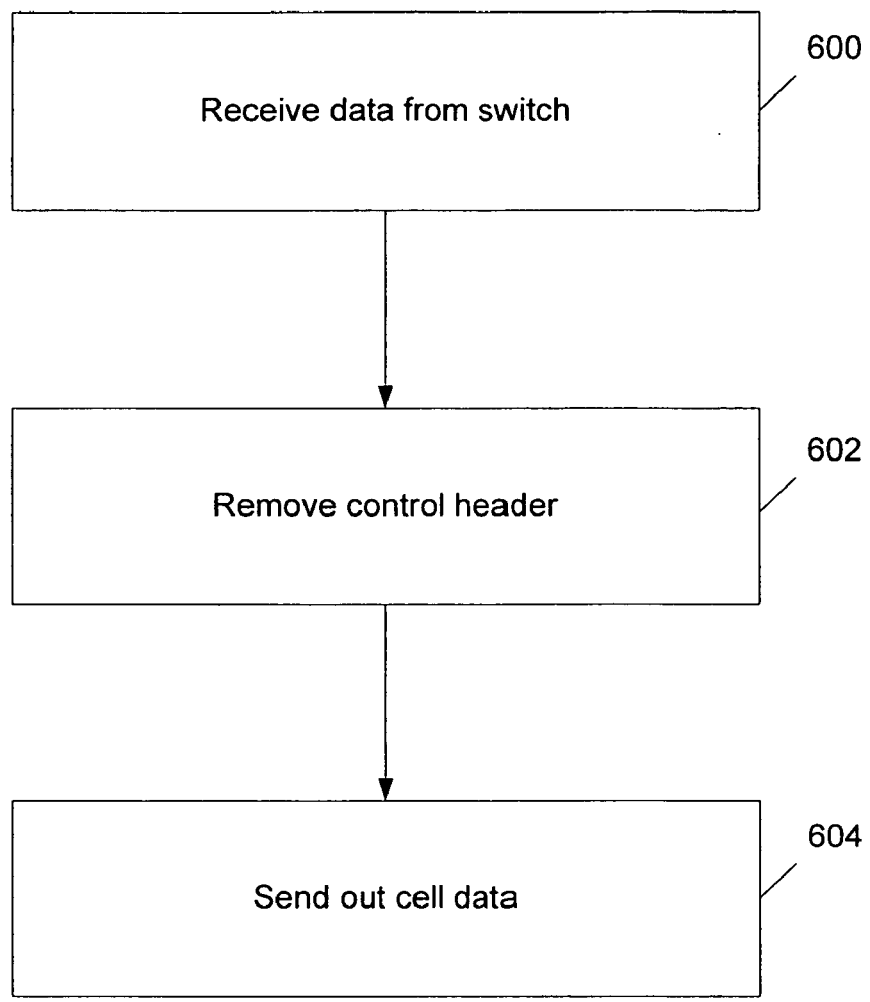
FIG. 6 is a flowchart illustrating the processing of a cell after it is received by the destination port, according to some embodiments.

FIG. 6 is a flowchart illustrating the processing of a cell after it is received by the destination port, according to some embodiments. In this example, once a data cell is received from the switch (600), its control header is removed (602). The payload of the cell data is then sent out from the fabric access device and further processed if necessary (604).

Figure 7:
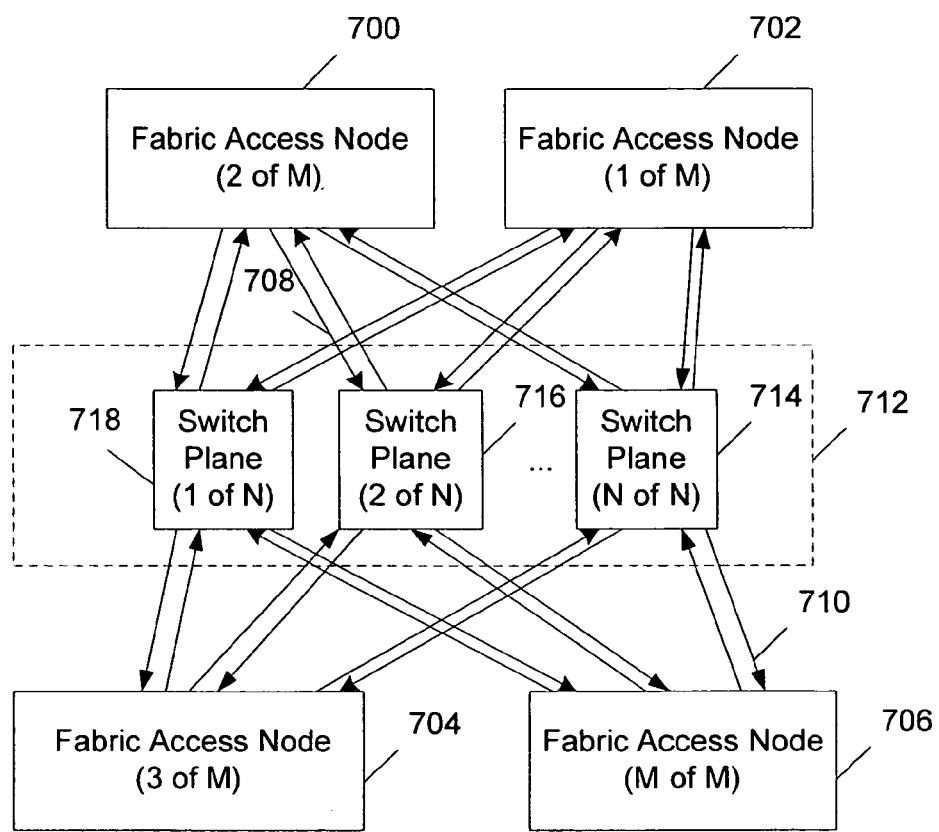
FIG. 7 is a diagram illustrating a switching system used in one embodiment.

FIG. 7 is a diagram illustrating a switching system used in one embodiment. In this example, a plurality of fabric access nodes 1 to M (700-706) are coupled to a switch fabric 712. Switch fabric 712 includes a plurality of switch planes 1 to N (714-718). Each of the switch planes can switch whole (non-striped) cells independently, without synchronization with other switch planes. Each fabric access node is connected to each switch plane via a bi-directional connection (e.g., ingress link 708 and its associated egress link comprise a bi-directional connection between fabric access node 700 and switch plane 716, and egress link 710 and its associated ingress link comprise a bi-directional connection between fabric access node 706 and switch plane 714). In this example, each fabric access node is associated with and used to service a port. A cell is transferred from a source port to a destination port via the connections shown in FIG. 7. The actual number of access nodes (ports) and switch planes depend on implementation and may vary for different embodiments.

Congestion or other problems associated with the link may prevent cells from being transferred to the appropriate location. A bi-directional connection that is unable to transfer its data in either the ingress or the egress direction is deemed to have failed. In one embodiment, this ensures that data is sent on a link (ingress or egress) only if the corresponding return link is available to deliver flow control (e.g., backpressure or synchronization state) information to the transmit end. In one embodiment, in the event of such a failure cells are automatically routed to alternative paths and are no longer sent on the failed connection, as described more fully below. In some embodiments, a link quality state machine maintained between the fabric access node and the switch plane is used to determine which links are available. The link quality state machine may be implemented as a processor, a logic circuit, or other appropriate hardware, software, firmware or combinations thereof. The link quality state machine is integrated with the fabric access nodes and/or the switch fabric in some embodiments, and is implemented as a separate component in some embodiments.

Figure 8:
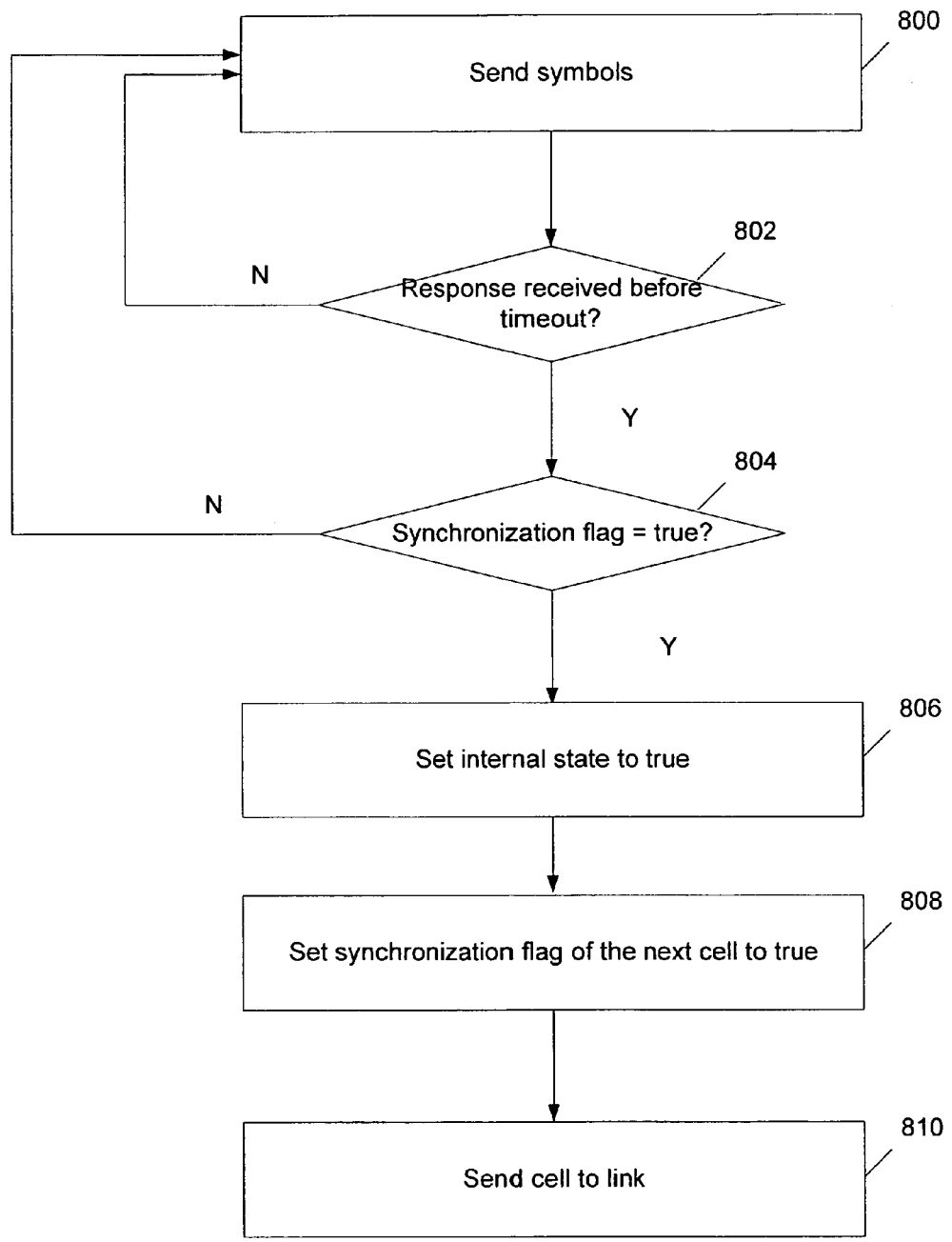
FIG. 8 is a flowchart illustrating an initialization process of a connection according to some embodiments.

FIG. 8 is a flowchart illustrating an initialization process of a connection according to some embodiments. A transmitter sends synchronization symbols to a receiver via a link associated with the connection (800). The initialization process may start in either the ingress direction or the egress direction. In other words, if the fabric access node is the transmitter, the switch plane is the receiver and vice versa. In some embodiments, the synchronization symbols are 8B/10B IDLE symbols. Other types of symbols suitable for synchronizing the link may also be used. If the receiver at the far end receives the synchronization symbols, it will set an internal flag indicating that good synchronization symbols are being received at the receiver from the transmitter at the far end. Once the transmitter at the receiving end has been enable, it will begin to send idle cells (no payload, but a properly formed control header) to the far end (i.e., the end from which it received the synchronization symbols). A synchronization flag set to true is included in some embodiments in the control header portion of the idle cells.

On the transmitter side (i.e., the side described above as sending the idle symbols), it is determined whether a response is received before a timeout occurs (802). In some embodiments, the response checked for in step 802 is a properly formed idle cell (or other cell). If no response is received before the time out, then the receiver may not have received the synchronization symbols or the response may be lost. Thus, the transmitter sends synchronization symbols again (800). If, however, a response is received in time, it is determined whether the synchronization flag in the response is set to true (804). If the synchronization flag is not set to true, it would indicate that the receiver did not receive the synchronization symbols properly. Thus, the synchronization symbols are sent again (800). If, however, the synchronization flag is set to true, then the receiver at the far end is determined to have received the synchronization symbols properly. At this point, the link is initialized and the cells can be transferred in both directions of the bi-directional connection. The transmitter then sets its internal state to true (806). This internal state indicates whether the transmitter is receiving properly formatted cells from the receiver. When the transmitter is ready to transmit the next cell, a synchronization flag included in the header of the next cell is set to the same value as the internal state of the transmitter (808). In this case, the synchronization flag informs the receiver at the far end that properly formed cells are being received from the far end, such that the bi-directional connection has been established. The cell is then sent to the receiver via the link (810).

Figure 9:
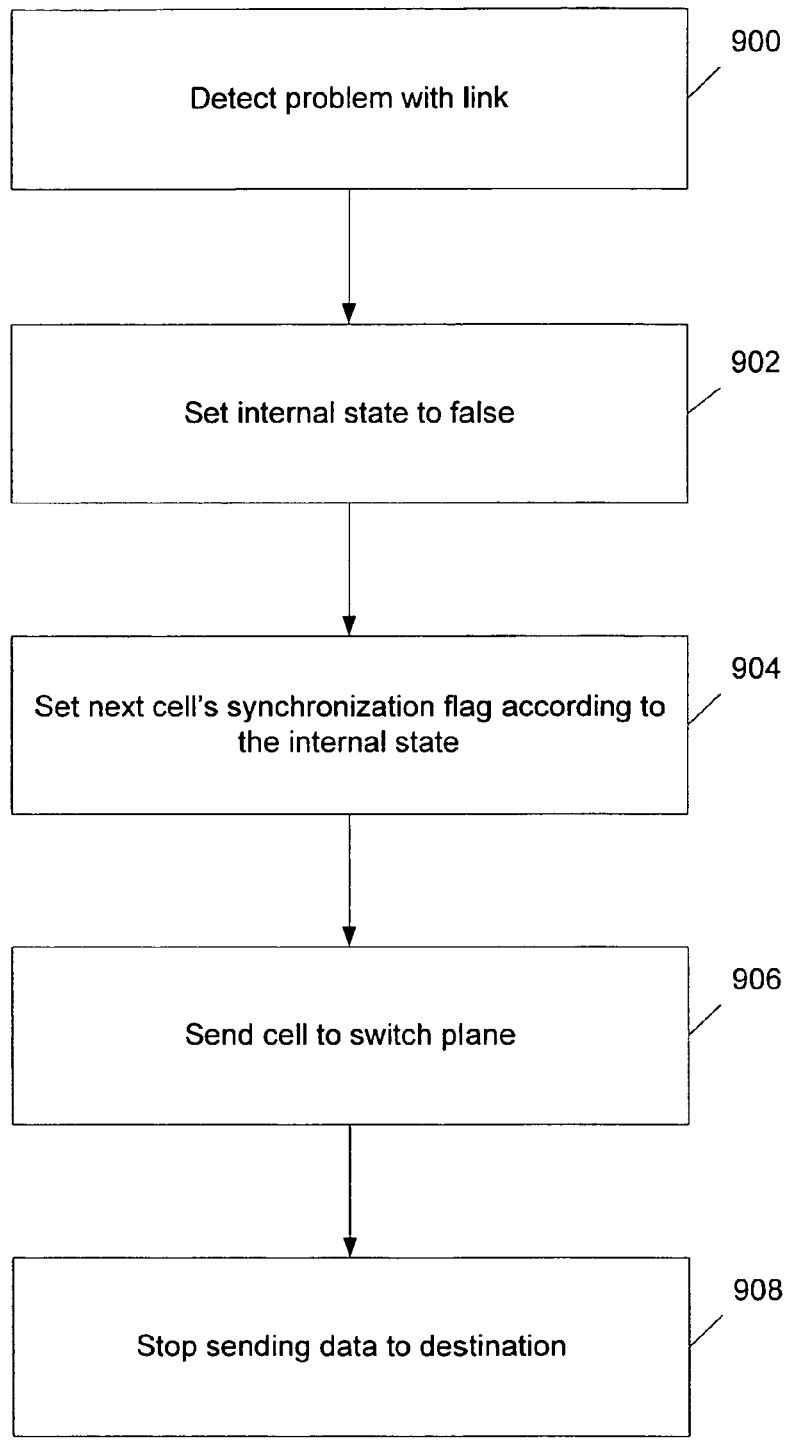
FIG. 9 is a flowchart illustrating the operation of a fabric access node in one embodiment when failure of an egress link is detected at the fabric access node.

FIG. 9 is a flowchart illustrating the operation of a fabric access node in one embodiment when failure of an egress link is detected at the fabric access node. In this example, a problem associated with an egress link such as link 710 of FIG. 7 is detected by a fabric access node such as 706 of FIG. 7 (800). There are various ways to detect the link problem. In some embodiments, the data cells are encoded according to a serial encoding standard such as 8B/10B, and each data cell includes a cyclic redundancy checksum (CRC) used for error detection. If a cell is transferred over a link that has problems, it is likely that an error will be detected. The fabric access node can detect the errors and determine whether there is a link failure by performing computation based on cell data received. A problem may also be detected at the fabric access node if the node stops receiving proper 8B/10B idle symbols. Upon detecting any link problem, the fabric access node sets its internal state to false (902). When the next cell is ready to be sent to the switch plane on the ingress link, its synchronization flag is set according to the internal state (904). The cell is then sent to the switch plane (906). When the cell is received by the switch plane and the synchronization flag detected, the egress link is marked as unavailable by the switch plane, and backpressure information is sent to other fabric access nodes to prevent them from sending more data to this destination via this link (908). Data may still be sent to other available ports and/or links.

Figure 10:
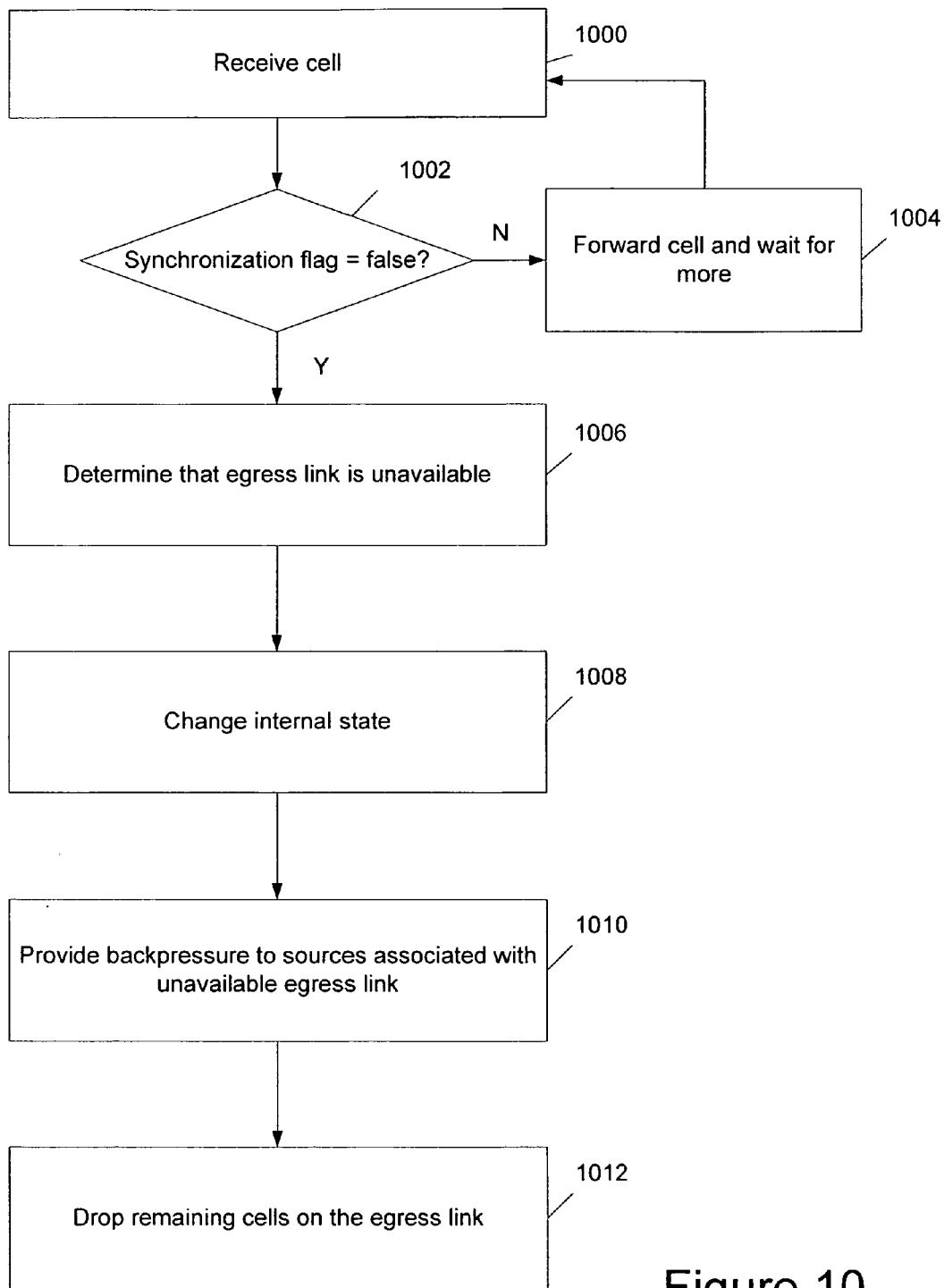
FIG. 10 is a flowchart illustrating the operation of a switch plane embodiment when an egress link failure is detected by the fabric access node at the far end.

FIG. 10 is a flowchart illustrating the operation of a switch plane embodiment when an egress link failure is detected by the fabric access node at the far end. The switch plane receives a cell (1000), and determines whether its synchronization link is set to false (1002). If the synchronization flag in the cell is not set to false, it indicates that the fabric access node has not detected any problems on the egress link. The switch fabric then forwards on the cell and waits for more cells to arrive (1004). If, however, the synchronization flag is determined to be false, it indicates that the egress link is unavailable (1006). Accordingly, the switch plane changes its internal state from true to false (1008). Backpressure information is then provided to sources associated with the unavailable egress link (1010). The backpressure information indicates to the sources that the link associated with the egress link is unavailable, and the sources should stop sending data to the port associated with the link via this switch plane. Cells remaining on the egress link or buffers associated with the link are discarded (1012).

Figure 11:
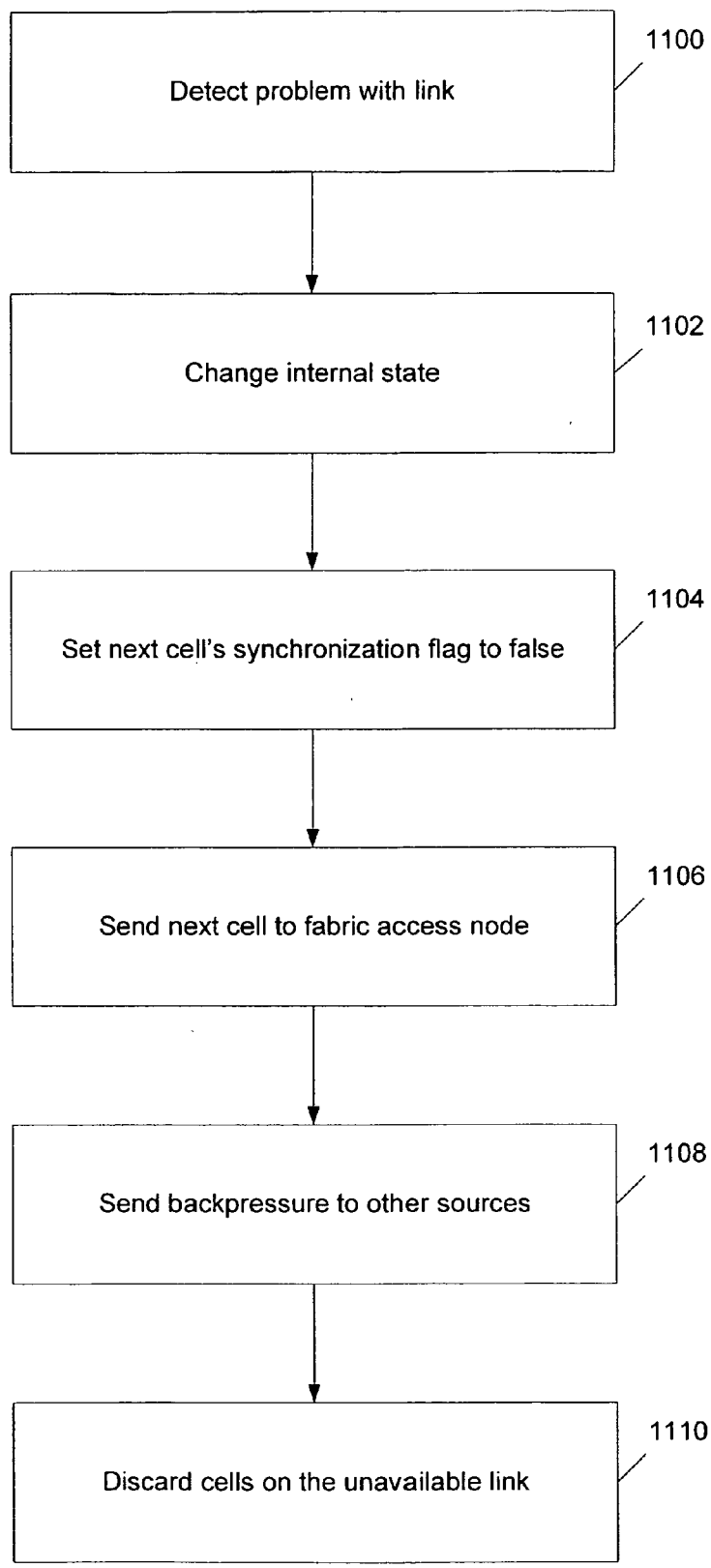
FIG. 11 is a flowchart illustrating the operations of a switch plane embodiment when an ingress link failure is detected by the switch plane.

FIG. 11 is a flowchart illustrating the operations of a switch plane embodiment when an ingress link failure is detected by the switch plane. In this example, a problem on an ingress link is detected (1100). The problem may be detected by, for example, detecting a loss of synchronization or detecting a CRC error in a cell received on the egress link associated with the ingress link. The switch plane's internal state flag for the failed ingress link is changed from true to false (1102). When the next cell becomes available to be sent to the fabric access node associated with the failed ingress link, the cell's synchronization flag is set to false to reflect the change in the internal state (1104). The next cell is sent to the fabric access node via the egress link (1106). Backpressure information is then sent to all the other potential sources, notifying the sources to stop using the link that has become unavailable (1108). Any cells that remain on the unavailable link or its associated buffer are dropped (1110).

Figure 12:
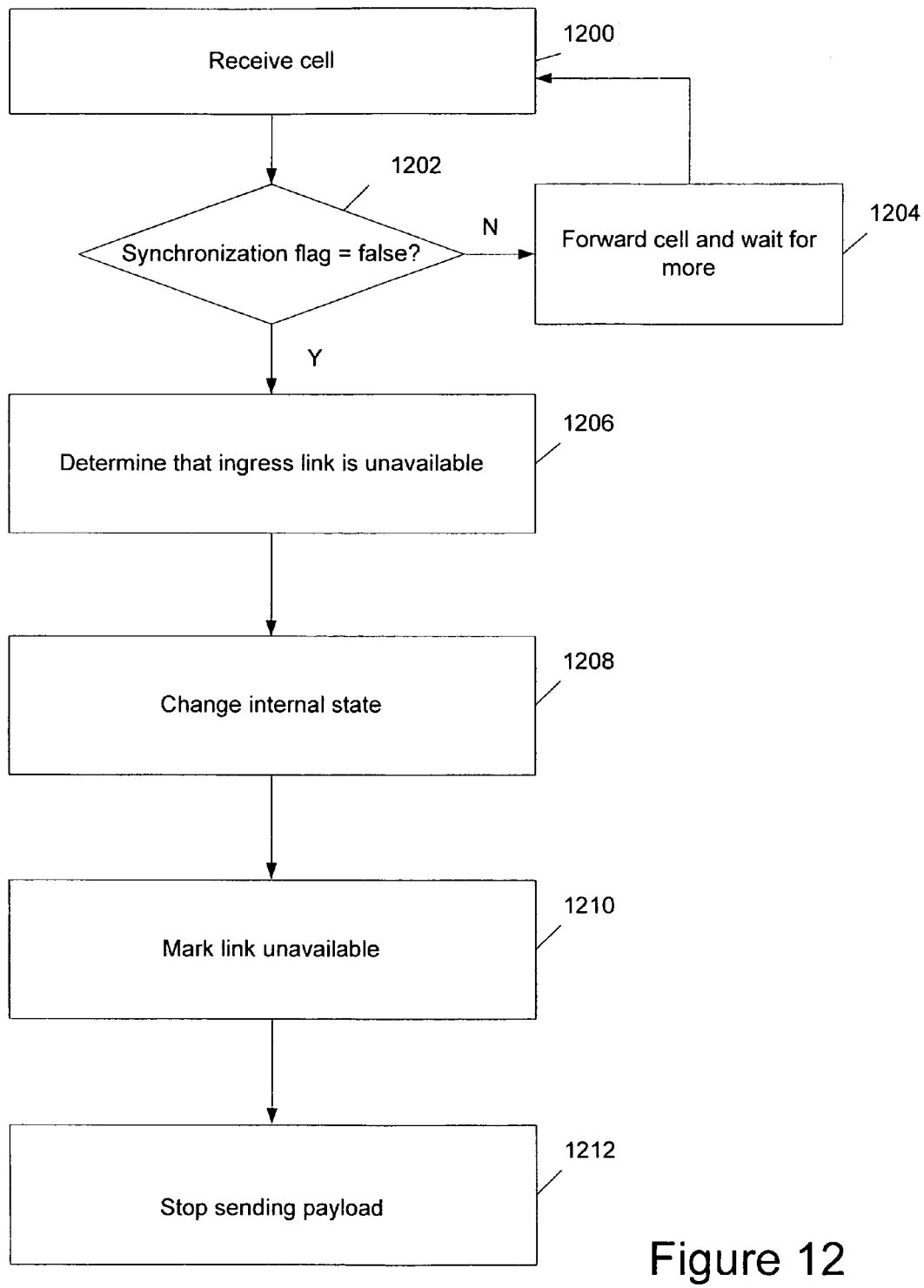
FIG. 12 is a flowchart illustrating the operation of a fabric access node in one embodiment when an ingress link failure is detected at the switch plane.

FIG. 12 is a flowchart illustrating the operation of a fabric access node in one embodiment when an ingress link failure is detected at the switch plane. In this example, the fabric access node receives cells on an egress link to the switch plane (1200), and checks the cells header to determine whether its synchronization flag is set to false (1202). If the synchronization flag is not false, the ingress link associated with the egress link on which the cell was received is operating normally and the cell is forwarded as usual and the fabric access node waits to receive more cells (1204). If, however, the synchronization flag is false, this would indicate that the ingress link is unavailable (1206). The fabric access node then changes its internal state from true to false (1208). The ingress link is marked unavailable (1210). Accordingly, the fabric access node will stop sending payload cells on the marked ingress link (1212).

Figure 13:
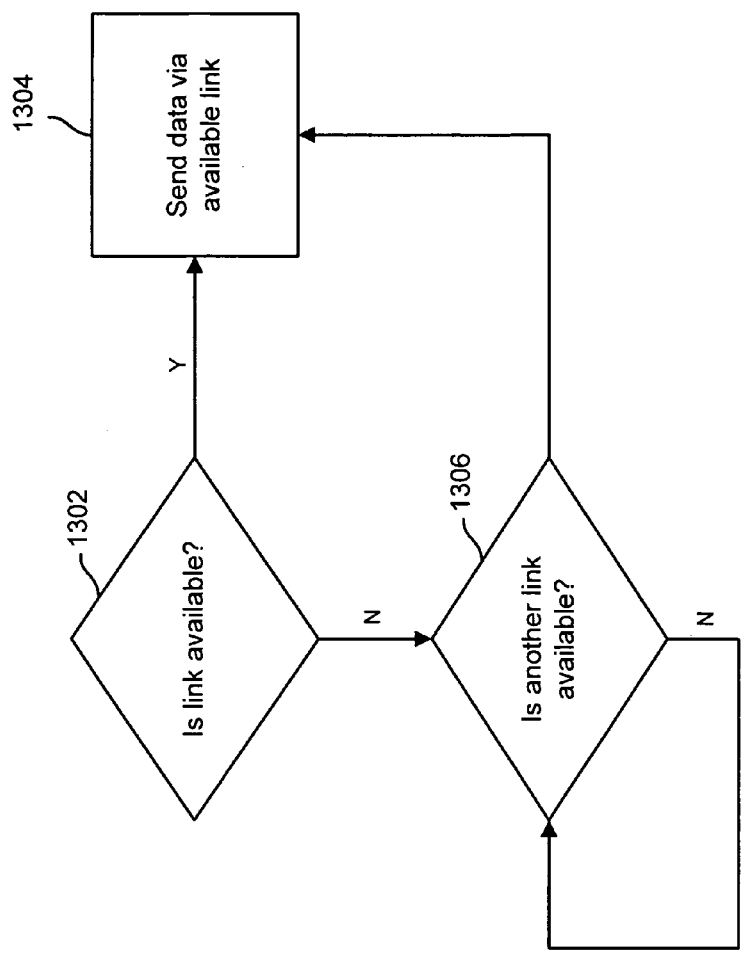
FIG. 13 is a flow chart illustrating a process implemented in some embodiments on a fabric access node for sending data via a switch fabric.

FIG. 13 is a flow chart illustrating a process implemented in some embodiments on a fabric access node for sending data via a switch fabric. In this example, data is sent into the switch fabric via a plurality of links to the fabric, each link providing access to a switch plane that may be used by the fabric access node to send data to a fabric access node having a link to the switch plane.

When a cell is available to be sent to the switch fabric, it is determined whether a link from the fabric access node to the switch fabric is available (1302). In some embodiments, the switch fabric is non-striping and the fabric access node schedules the links to send cells in accordance with a scheduling process such as that disclosed in U.S. patent application Ser. No. 10/740,720, incorporate herein by reference above. The link that is examined for availability may be selected according to such a scheduling process, or any other appropriate selection process.

If the link is determined to be available, the cell is then transferred via the link (1304). Otherwise, another one of the plurality of links is examined to determine whether it is available (1306). If the other link is available, it is used to transfer the cell (1304). If, however, the link is not available, the process is repeated to determine whether any of the remaining links is available (1306) until an available link is found. Optionally, when a link is determined to be unavailable, an indication may be sent to the data source to prevent any more data from being transferred to the unavailable link. The indication may be a loss of synchronization on the corresponding egress link or an error detected at the fabric access node in a cell received on the egress link (as in step 900 of FIG. 9), or detection of a synchronization state flag set to false in a cell received on the egress link (as in steps 1202 and 1206 of FIG. 12). The fabric access node may continue to send data via the remaining available links to the switch fabric. In one embodiment, this is accomplished by continuing to schedule cells to be transmitted via the remaining available links while not scheduling cells to be sent via the unavailable link. In this way, the loss of a single link does not result in the loss of any other links to the switch fabric, minimizing the impact of the link failure on the ability of the fabric access node to send data to nodes associated with the switch fabric.

In one embodiment, a fabric access node may have up to 2N links to a switch fabric, where N represents the number of links required to maintain line rate data flow. Since such a fabric access node configured as described herein may use any number of links, from 1 to maximum, redundancy from N+1 to 2N is supported automatically, without requiring any software intervention, simply by providing the access node with N+1 to 2N links to the switch fabric (depending on the level of redundancy desired). For example, if 8 links were required to maintain line rate data flow, N+1 redundancy could be provided by providing the fabric access node with 9 links to the switch fabric, sending data over all 9 links in accordance with a scheduling process such as described above, and automatically continuing to send data over the remaining 8 links in the event of failure of one of the 9 links, as described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of transferring data via a switch fabric, comprising:
   for each unit of data to be transferred, selecting one of a plurality of ingress links from a fabric access node to the switch fabric to transfer the unit of data;
   in the event that one or more of the plurality of ingress links become unavailable, such that one or more remaining ingress links remain available for transferring data, transferring a subsequently received unit of data via one of the remaining ingress links;
   wherein an ingress link included in the plurality of ingress links is determined to be unavailable if a control information included by the switch fabric in a unit of data received from the switch fabric via an egress link with which the ingress link is associated indicates that a failure associated with the egress link associated with the ingress link has been detected by the switch fabric; and
   wherein the egress link is associated with the ingress link by virtue of being associated with a same fabric access node as the ingress link; and wherein the switch fabric is configured to detect the failure associated with the ingress link; set an internal state data of the switch plane to reflect the detected failure; and include the control information in the unit of data prior to sending the unit of data out of the switch fabric via the egress link with which the ingress link is associated.

2. A method of transferring data via a switch fabric as recited in claim 1, wherein the data includes a cell.

3. A method of transferring data via a switch fabric as recited in claim 1, wherein the data includes non-striped cell.

4. A method of transferring data via a switch fabric as recited in claim 1, wherein the switch fabric includes a plurality of switch planes.

5. A method of transferring data via a switch fabric as recited in claim 1, wherein the first link is a part of a bi-directional connection.

6. A method of transferring data via a switch fabric as recited in claim 1, wherein the first link is a part of a bi-directional connection that includes an ingress link and an egress link.

7. A method of transferring data via a switch fabric as recited in claim 1, further comprising receiving an indication that one of the plurality of links has become unavailable.

8. A method of transferring data via a switch fabric as recited in claim 7, wherein receiving an indication that one of the plurality of links has become unavailable includes receiving from the switch fabric on an egress link associated with the one of the plurality of links a cell comprising data indicating that the one of the plurality of links has failed.

9. A method of transferring data via a switch fabric as recited in claim 7, wherein receiving an indication that one of the plurality of links has become unavailable includes receiving from the switch fabric on an egress link associated with the one of the plurality of links a cell comprising a synchronization flag indicating that the one of the plurality of links has failed.

10. A method of transferring data via a switch fabric as recited in claim 7, wherein receiving an indication that one of the plurality of links has become unavailable includes receiving from the switch fabric on an egress link associated with the one of the plurality of links a cell comprising a synchronization flag indicating that said egress link associated with the one of the plurality of links has failed.

11. A method of transferring data via a switch fabric as recited in claim 7, wherein receiving an indication that one of the plurality of links has become unavailable includes receiving from the switch fabric on an egress link associated with the one of the plurality of links a cell based on which an error is detected.

12. A method of transferring data via a switch fabric as recited in claim 7, wherein receiving an indication that one of the plurality of links has become unavailable includes receiving from the switch fabric on an egress link associated with the one of a plurality of links a cell based on which an error is detected by performing a cyclic redundancy check on the cell.

13. A method of transferring data via a switch fabric as recited in claim 7, wherein receiving an indication that one of the plurality of links has become unavailable includes detecting a loss of synchronization with respect to an egress link associated with the one of a plurality of links.

14. A method of transferring data via a switch fabric as recited in claim 7, wherein receiving an indication that one of the plurality of links has become unavailable includes receiving backpressure information on an egress link associated with the one of the plurality of links.

15. A method of transferring data via a switch fabric as recited in claim 1, further comprising sending an indicator to the switch fabric, wherein the indicator indicates that the one of the plurality of links is unavailable.

16. A method of transferring data via a switch fabric as recited in claim 1, further comprising sending backpressure information to a data source, wherein the backpressure information indicates that one of the plurality of links is unavailable and that the data source should prevent more data from being transferred to the unavailable.

17. A method of transferring data via a switch fabric as recited in claim 1, in the event that one or more of the plurality of links become unavailable, further comprising stopping sending data to the one or more unavailable links.

18. A method of transferring data via a switch fabric as recited in claim 1, wherein each of the plurality of links connect between a fabric access node and the switch fabric.

19. A method of transferring data via a switch fabric as recited in claim 1, further comprising, in the event that one or more of the remaining links become unavailable such that one or more still remaining links remain available for transferring data, transferring another subsequently received unit of data via one of the still remaining links.

20. A network fabric access device, comprising:
a plurality of ingress links coupled to a switch fabric and a fabric access node, wherein:
for each unit of data to be transferred, one of the plurality of ingress links is selected to transfer the unit of data; and
in the event that one or more of the plurality of ingress links become unavailable, such that one or more remaining ingress links remain available for transferring data, a subsequently received unit of data is transferred via one of the remaining ingress links;
wherein an ingress link included in the plurality of ingress links is determined to be unavailable if a control information included by the switch fabric in a unit of data received from the switch fabric via an egress link with which the ingress link is associated indicates that a failure associated with the egress link associated with the ingress link has been detected by the switch fabric; and
wherein the egress link is associated with the ingress link by virtue of being associated with a same fabric access node as the ingress link; and wherein the switch fabric is configured to detect the failure associated with the ingress link; set an internal state data of the switch plane to reflect the detected failure; and include the control information in the unit of data prior to sending the unit of data out of the switch fabric via the egress link with which the ingress link is associated.

21. A computer program product for controlling a registration overlay, the computer program product being embodied in a computer readable storage medium and comprising computer instructions for:
for each unit of data to be transferred, selecting one of a plurality of ingress links from a fabric access node to the switch fabric to transfer the unit of data; and
in the event that one or more of the plurality of ingress links become unavailable, such that one or more remaining ingress links remain available for transferring data, transferring a subsequently received unit of data via one of the remaining ingress links;
wherein an ingress link included in the plurality of ingress links is determined to be unavailable if a control information included by the switch fabric in a unit of data received from the switch fabric via an egress link with which the ingress link is associated indicates that a failure associated with the egress link associated with the ingress link has been detected by the switch fabric; and
wherein the egress link is associated with the ingress link by virtue of being associated with a same fabric access node as the ingress link; and
wherein the switch fabric is configured to detect the failure associated with the ingress link;
set an internal state data of the switch plane to reflect the detected failure; and
include the control information in the unit of data prior to sending the unit of data out of the switch fabric via the egress link with which the ingress link is associated.

* * * * *

UNITED STATES PATENT AND TRADEMARK OFFICE
CERTIFICATE OF CORRECTION

PATENT NO. : 7,660,239 B2  Page 1 of 1
APPLICATION NO. : 10/831629
DATED : February 9, 2010
INVENTOR(S) : Willhite et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1105 days.

Signed and Sealed this

Twenty-eighth Day of December, 2010

David J. Kappos
*Director of the United States Patent and Trademark Office*